United States Patent
Goutal et al.

(10) Patent No.: US 10,997,366 B2
(45) Date of Patent: May 4, 2021

(54) METHODS, DEVICES AND SYSTEMS FOR DATA AUGMENTATION TO IMPROVE FRAUD DETECTION

(71) Applicant: Vade Secure Inc., San Francisco, CA (US)

(72) Inventors: Sebastien Goutal, San Francisco, CA (US); Maxime Marc Meyer, Montreal (CA)

(73) Assignee: VADE SECURE INC., San Francisco, CA (US)

( * ) Notice: Subject to any disclaimer, the term of this patent is extended or adjusted under 35 U.S.C. 154(b) by 0 days.

(21) Appl. No.: 16/595,941

(22) Filed: Oct. 8, 2019

(65) Prior Publication Data
US 2020/0159993 A1    May 21, 2020

Related U.S. Application Data

(62) Division of application No. 16/013,581, filed on Jun. 20, 2018, now Pat. No. 10,664,656.

(51) Int. Cl.
*G06F 40/247* (2020.01)
*G06N 7/00* (2006.01)
(Continued)

(52) U.S. Cl.
CPC ........ *G06F 40/247* (2020.01); *G06F 16/9024* (2019.01); *G06F 21/64* (2013.01);
(Continued)

(58) Field of Classification Search
CPC .... G06F 40/247; G06F 40/194; G06F 40/166; G06F 40/232; G06F 40/30; G06F 16/9024; G06F 21/64; G06N 7/005
(Continued)

(56) References Cited

U.S. PATENT DOCUMENTS

| 5,541,837 A  * |  7/1996 | Fushimoto | .............. | G06F 40/58 |
| | | | | 704/2 |
| 6,278,967 B1 * |  8/2001 | Akers | ..................... | G06F 40/44 |
| | | | | 704/2 |

(Continued)

OTHER PUBLICATIONS

Random selection, weighted by rank; May 23, 2017; StackOverflow. com; pp. 1-3.*

(Continued)

*Primary Examiner* — Andrew R Dyer
(74) *Attorney, Agent, or Firm* — Young Law Firm, P.C.

(57) ABSTRACT

A computer-implemented method of generating an augmented electronic text document comprises establishing a directed multigraph where each vertex is associated with a separate language and is connected to at least one other one of the vertices by an oriented edge indicative of a machine translation engine's ability to translate between languages associated with the vertices connected by the oriented edge with acceptable performance. The directed multigraph is then traversed starting at a predetermined origin vertex associated with an original language of the original electronic text document by randomly selecting an adjacent vertex pointed to by an oriented edge connected to the predetermined origin vertex and causing a machine translation engine to translate the original electronic text document from the original language to a language associated with the selected vertex. The directed multigraph is then further traversed as allowed by the oriented edges from the intermediate vertex to successive other next-adjacent connected vertices, each time machine translating a previously-translated electronic text document into a language associated with a randomly-selected next-adjacent vertex until the predetermined origin vertex is selected and the previously translated electronic text document is re-translated into the (Continued)

original language and designated as the augmented electronic text document.

2 Claims, 6 Drawing Sheets

(51) Int. Cl.
*G06F 21/64* (2013.01)
*G06F 16/901* (2019.01)
*G06F 40/30* (2020.01)
*G06F 40/166* (2020.01)
*G06F 40/194* (2020.01)
*G06F 40/232* (2020.01)

(52) U.S. Cl.
CPC .......... *G06F 40/166* (2020.01); *G06F 40/194* (2020.01); *G06F 40/232* (2020.01); *G06F 40/30* (2020.01); *G06N 7/005* (2013.01)

(58) Field of Classification Search
USPC ........................................................ 715/271
See application file for complete search history.

(56) References Cited

U.S. PATENT DOCUMENTS

| | | | | |
|---|---|---|---|---|
| 6,460,036 B1* | 10/2002 | Herz | ................ | G06Q 30/02 707/748 |
| 6,810,376 B1* | 10/2004 | Guan | ................ | G06F 40/30 704/9 |
| 6,937,974 B1* | 8/2005 | d'Agostini | ................ | G06F 40/58 704/2 |
| 6,996,518 B2* | 2/2006 | Jones | ................ | G06F 40/55 704/8 |
| 7,225,199 B1* | 5/2007 | Green | ................ | G06F 40/30 |
| 7,249,117 B2* | 7/2007 | Estes | ................ | G16H 50/70 706/52 |
| 7,346,491 B2* | 3/2008 | Kanagasabai | ................ | G06F 40/211 704/9 |
| 7,451,487 B2* | 11/2008 | Oliver | ................ | G06F 21/51 709/206 |
| 7,529,765 B2* | 5/2009 | Brants | ................ | G06F 40/30 |
| 8,447,285 B1 | 5/2013 | Bladon et al. | | |
| 8,495,001 B2* | 7/2013 | Sweeney | ................ | G06F 16/36 706/55 |
| 8,510,302 B2* | 8/2013 | Sweeney | ................ | G06F 16/353 707/736 |
| 8,543,378 B1* | 9/2013 | Westphal | ................ | G06F 40/232 704/9 |
| 8,543,563 B1 | 9/2013 | Nikoulina et al. | | |
| 8,615,807 B1* | 12/2013 | Higbee | ................ | G06F 21/577 726/25 |
| 8,676,732 B2* | 3/2014 | Sweeney | ................ | G06F 16/9535 706/12 |
| 8,849,860 B2* | 9/2014 | Ilyas | ................ | G06F 16/84 707/791 |
| 8,863,279 B2* | 10/2014 | McDougal | ................ | H04L 63/1416 726/22 |
| 8,898,134 B2* | 11/2014 | Bobick | ................ | G06F 16/954 707/706 |
| 8,941,512 B2 | 1/2015 | Markram | | |
| 8,996,492 B2 | 3/2015 | Paradies et al. | | |
| 9,104,779 B2* | 8/2015 | Hunt | ................ | G06N 5/02 |
| 9,106,694 B2* | 8/2015 | Aziz | ................ | G06F 21/562 |
| 9,235,806 B2* | 1/2016 | Sweeney | ................ | G06N 7/005 |
| 9,246,933 B1* | 1/2016 | Krishnappa | ................ | G06F 21/564 |
| 9,330,175 B2* | 5/2016 | Bobick | ................ | G06F 16/951 |
| 9,342,499 B2 | 5/2016 | Madnami et al. | | |
| 9,348,815 B1* | 5/2016 | Estes | ................ | G06F 40/30 |
| 9,398,047 B2* | 7/2016 | Goutal | ................ | H04L 51/12 |
| 9,448,996 B2 | 9/2016 | Orsini et al. | | |
| 9,571,510 B1* | 2/2017 | Shen | ................ | H04L 63/1441 |
| 9,635,052 B2* | 4/2017 | Hadnagy | ................ | H04L 51/12 |
| 9,684,649 B2* | 6/2017 | Shen | ................ | G06F 40/279 |
| 9,715,547 B2* | 7/2017 | Graham | ................ | G06F 16/9535 |
| 9,721,559 B2* | 8/2017 | Cui | ................ | G10L 15/063 |
| 9,811,776 B2* | 11/2017 | Elbaz | ................ | G06F 16/3338 |
| 9,942,249 B2* | 4/2018 | Gatti | ................ | H04L 63/1483 |
| 9,965,461 B2* | 5/2018 | Jackson | ................ | G06F 40/253 |
| 10,121,467 B1* | 11/2018 | Gandhe | ................ | G06F 40/284 |
| 10,453,117 B1* | 10/2019 | Reavely | ................ | G06F 40/295 |
| 10,628,553 B1* | 4/2020 | Murrish | ................ | G06F 16/2365 |
| 10,769,241 B1* | 9/2020 | McNair | ................ | G16H 50/70 |
| 2002/0087301 A1* | 7/2002 | Jones | ................ | G06F 40/20 704/2 |
| 2002/0111788 A1* | 8/2002 | Kimpara | ................ | G06F 40/58 704/2 |
| 2002/0128831 A1* | 9/2002 | Ju | ................ | G10L 15/18 704/231 |
| 2002/0169793 A1* | 11/2002 | Sweeney | ................ | G06F 21/6245 |
| 2003/0040900 A1* | 2/2003 | D'Agostini | ................ | G06F 40/47 704/2 |
| 2004/0117192 A1* | 6/2004 | Miletzki | ................ | B07C 3/14 704/277 |
| 2004/0229199 A1* | 11/2004 | Ashley | ................ | G09B 7/00 434/323 |
| 2005/0288920 A1* | 12/2005 | Green | ................ | G06F 40/30 704/3 |
| 2006/0004572 A1* | 1/2006 | Ju | ................ | G10L 15/06 704/243 |
| 2007/0038615 A1* | 2/2007 | Vadon | ................ | G06F 40/232 |
| 2007/0143100 A1* | 6/2007 | Agapi | ................ | G06F 16/36 704/9 |
| 2007/0271266 A1* | 11/2007 | Acharya | ................ | G06N 5/022 |
| 2008/0221864 A1* | 9/2008 | Blumenthal | ................ | G06F 40/40 704/4 |
| 2008/0240425 A1* | 10/2008 | Rosales | ................ | G06F 21/6254 380/28 |
| 2008/0319990 A1* | 12/2008 | Taranenko | ................ | G06F 16/29 |
| 2009/0007272 A1* | 1/2009 | Huang | ................ | G06F 21/57 726/26 |
| 2009/0157675 A1* | 6/2009 | Stellhorn | ................ | G06Q 10/107 |
| 2009/0300012 A1* | 12/2009 | Levow | ................ | H04L 51/12 |
| 2009/0313005 A1* | 12/2009 | Jaquinta | ................ | G06F 40/58 704/2 |
| 2010/0070521 A1* | 3/2010 | Clinchant | ................ | G06F 16/3337 707/760 |
| 2010/0094673 A1* | 4/2010 | Lobo | ................ | G06Q 30/0273 705/14.69 |
| 2010/0114840 A1* | 5/2010 | Srivastava | ................ | G06F 21/6254 707/688 |
| 2010/0262836 A1* | 10/2010 | Peukert | ................ | G06F 21/6254 713/189 |
| 2011/0040552 A1* | 2/2011 | Van Guilder | ................ | G06F 40/18 704/4 |
| 2011/0046939 A1* | 2/2011 | Balasaygun | ................ | H04L 45/02 704/2 |
| 2011/0126122 A1* | 5/2011 | Forman | ................ | G06F 16/9535 715/745 |
| 2011/0178943 A1* | 7/2011 | Motahari | ................ | G06F 21/6254 705/325 |
| 2011/0208733 A1* | 8/2011 | Boss | ................ | G06F 16/90328 707/728 |
| 2011/0282643 A1 | 11/2011 | Chatterjee et al. | | |
| 2012/0016663 A1* | 1/2012 | Gillam | ................ | G06F 16/90344 704/9 |
| 2013/0238336 A1* | 9/2013 | Sung | ................ | G10L 15/005 704/255 |
| 2013/0301953 A1* | 11/2013 | Montague | ................ | G06F 3/0481 382/276 |
| 2014/0122442 A1* | 5/2014 | Takenouchi | ................ | G06F 16/2365 707/687 |
| 2014/0201043 A1* | 7/2014 | Arditi | ................ | G06Q 40/10 705/30 |
| 2014/0222928 A1* | 8/2014 | Scholtes | ................ | H04L 51/046 709/206 |
| 2014/0277921 A1* | 9/2014 | Gujjar | ................ | G05B 23/0221 701/32.9 |

(56) References Cited

U.S. PATENT DOCUMENTS

| | | | | |
|---|---|---|---|---|
| 2014/0304244 A1* | 10/2014 | Toyoda | ............... | G06F 16/2228 |
| | | | | 707/696 |
| 2014/0358516 A1* | 12/2014 | Lin | ........................ | G06F 40/58 |
| | | | | 704/2 |
| 2015/0169895 A1* | 6/2015 | Gkoulalas-Divanis | ........................ | |
| | | | | G06F 21/6254 |
| | | | | 726/26 |
| 2015/0379422 A1* | 12/2015 | Chandler | ............... | G06N 20/00 |
| | | | | 706/12 |
| 2016/0164901 A1* | 6/2016 | Mainieri | ................ | G06N 7/005 |
| | | | | 726/23 |
| 2017/0032484 A1* | 2/2017 | Nunley | ............... | G06F 16/9535 |
| 2017/0177907 A1* | 6/2017 | Scaiano | ............. | G06F 21/6254 |
| 2017/0318049 A1* | 11/2017 | Maylor | ............... | G06F 21/6245 |
| 2017/0371869 A1* | 12/2017 | Zhang | ..................... | G06F 40/51 |
| 2018/0357224 A1* | 12/2018 | Yamauchi | ............... | G06F 40/51 |
| 2019/0080116 A1* | 3/2019 | Kenthapadi | ........... | H04L 9/0643 |

OTHER PUBLICATIONS

Augment; Jan. 5, 2017; merriam-webster.com; 13 Pages.*
Classification Definitions Class 715, Data Processing: Presentation Processing of Document, Operator Interface Processing, and Screen Saver Display Processing; Feb. 2011; USPTO.gov; 33 Pages.*
List; May 12, 2017; dictionary.com; pp. 1-11.*
A list with only one item; Sep. 1, 2010; stackexchange.com; 4 Pages.*
International Search Report and Written Opinion of International Searching Authority dated Oct. 24, 2019 in PCT/US19/38031, 18 pages.

* cited by examiner

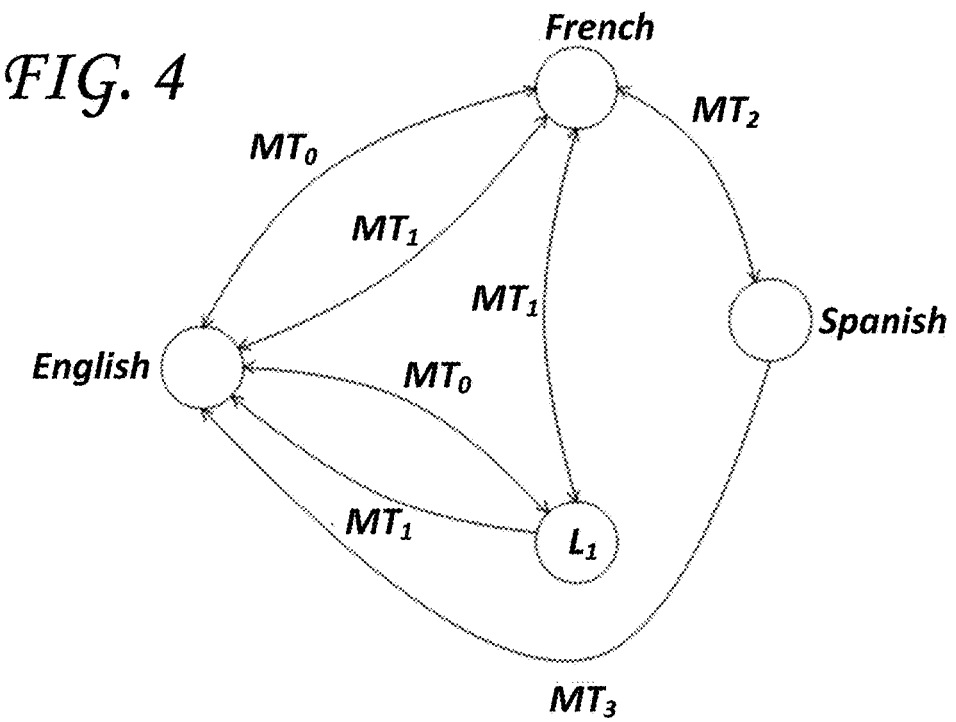
FIG. 4
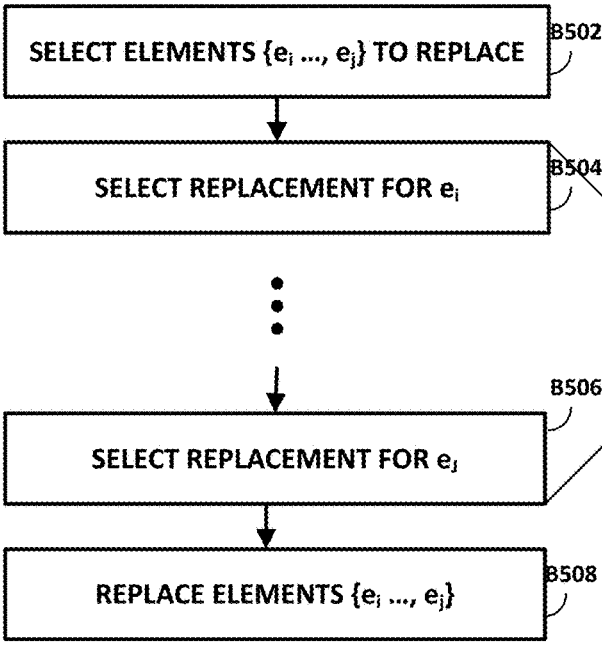
FIG. 5
FIG. 6

METHODS, DEVICES AND SYSTEMS FOR DATA AUGMENTATION TO IMPROVE FRAUD DETECTION

BACKGROUND

The field of the disclosed embodiments encompasses text augmentation techniques that find utility in improving fraud detection. Herein, the word "fraud" includes any fraudulent scheme that may be perpetrated by email, text message, instant messaging or phone calls, in which the core of the fraudulent scheme is a text or other electronic message that leads the victim to perform an action desired by the criminal, such as a wire transfer or a disclosure of confidential information. Such fraudulent schemes often rely on social engineering. Phone calls are included herein because fraudulent phone calls can be placed by robocalls. These robocalls are included with the scope of the present disclosure as a recorded voice message may be generated from the processing of an electronic text document by a voice synthesizer.

BRIEF DESCRIPTION OF THE DRAWINGS

FIG. 4 shows one particular implementation of an exemplary directed multigraph according to one embodiment.

FIG. 5 is a block diagram of a computer-implemented method for selecting and replacing elements within a text document of a corpus of electronic text documents, according to one embodiment.

FIG. 10 also shows examples of tangible computer-readable media configured to store computer-readable instructions that, when executed by a computing device, configure a general-purpose computer as a computing device that has been reconfigured to carry out the computer-implemented methods and the functionalities described and shown herein.

DETAILED DESCRIPTION

Figure 1:
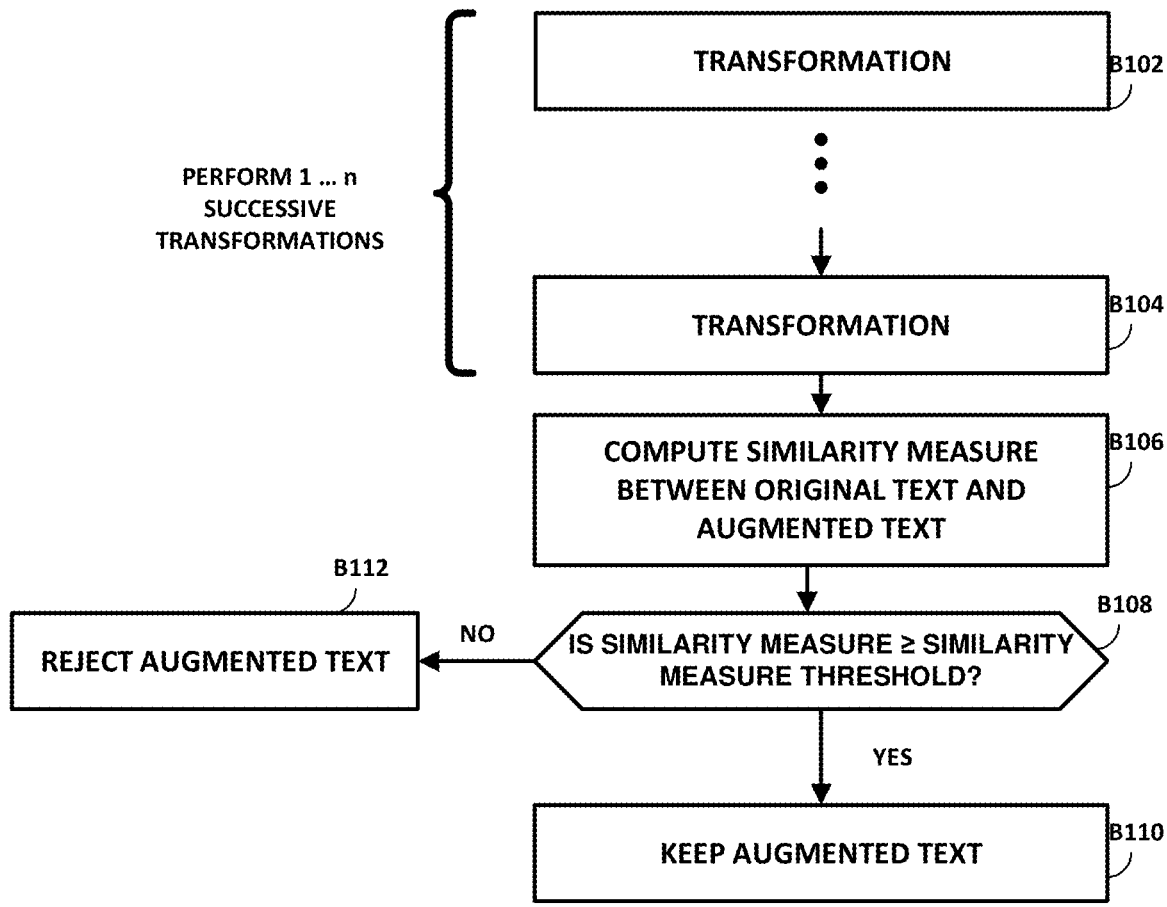
FIG. 1 is a block diagram of a computer-implemented method for data augmentation to improve fraud detection, according to one embodiment.

A large proportion of frauds are distributed by email. For example, advanced fee fraud has been reported since at least a decade. An advanced fee fraud attempts to defraud the recipient by promising him or her a significant share of a large sum of money in return for a small up-front payment, which the fraudster requires in order the obtain the large sum. If the victim pays the fee, then the fraudster either invents a series of further fees for the victim or simply disappears. Another example of such electronic text-based fraud is CEO fraud. In CEO fraud, the fraudster spoofs company email accounts and impersonates the CEO—or another senior executive—to fool an employee in accounting or HR into executing wire transfers or sending confidential information—such as W-2 tax information.

Here is an example of CEO fraud:

---

Subject: Same day payment
Hi Harry,
Hope your day is going on fine. I need you to make a same day UK payment for me.
Kindly email me the required details you will need to send out the payment.
I will appreciate a swift email response.
Kind regards,
Jack

---

As noted above, the core of the fraudulent scheme is a text, which is thus amenable to Natural Language Processing technics associated with Supervised Classification to detect such frauds. As no malicious link and/or malicious attachment are included in the text of the electronic communication, these frauds cannot be detected with existing malicious link technologies and/or malicious attachment-related technologies. The performance of technology based on Natural Language Processing and/or Supervised Classification largely relies on the quantity and the quality of the labelled data. However, it can be very challenging—and sometimes even impossible—to collect sufficient data to build a performant fraud detection model.

For example, let us consider the case of CEO fraud. CEO fraud typically targets HR or accounting department of small & medium-sized businesses, requires the criminal to thoroughly study the organization and operation of the company to build a realistic fraud context, and may require additional actions by the fraudster, like conducting phone calls with the intended victim. CEO fraud cannot be automated and scaled, as can more widespread threats like phishing or malware. Furthermore, the criminal doesn't really need to scale, because quality matters more than quantity, as a single well-executed fraud can lead to significant financial gains. Consequently, it is extremely difficult to collect exemplars of such frauds. Indeed, as of this writing, the present inventors have been able to collect only three dozen instances of CEO frauds. Thus, what are needed, therefore, are methods augmenting the quantity of the labelled data, so that a performant fraud detection model may be constructed, even when actual exemplars of such frauds are few and far between.

Many data augmentation techniques exist to improve the generalization of models in image and speech recognition. Recently, data augmentation techniques have been used to enhance the quality of deep learning models that rely on convolutional neural networks. For example, in the image recognition field, a good model should exhibit invariance towards changes in viewpoint, illumination and should be tolerant to noise. To improve deep learning models in image recognition, data are typically augmented with geometric transformations (translation, scaling, rotation, flipping, cropping, elastic deformation), change in illumination or noise addition. For example, some data augmentation methods for images are based on occlusion and inpainting.

Similarly, in the speech recognition field, data may be augmented by adding artificial noise background, changing the tone or speed of speech signal, or may be based upon stochastic feature mapping.

In terms of text, it is not reasonable to augment the data using signal transformations as is done in the image and speech recognition fields, as these transformations are likely to alter the syntax and the meaning of the original text. One proposed approach is to replace words by their synonyms using a thesaurus. One such approach includes augmenting a dataset by representing it as a taxonomy after imputing the degree of membership of each record of the original dataset.

Text Augmentation Function

One embodiment includes a text data augmentation function. For practical purposes in this disclosure, such a function is called TextDataAugmentationFunction. This function takes a text document OriginalText as an input, and outputs a text document AugmentedText. As shown in FIG. 1, according to one embodiment, this function applies 1 . . . n successive transformations to OriginalText to produce AugmentedText, as shown at B102, B104. Each transformation performed may include a certain amount of randomness. After the successive transformations, OriginalText and AugmentedText may be compared to ensure that AugmentedText is still relevant. One metric that may be used is the semantic similarity measure between OriginalText and AugmentedText. As shown at B106, a similarity measure is computed for the resultant AugmentedText, based on OriginalText. If, as shown at B108, the similarity measure SimMeasure is greater or equal to a similarity measure threshold SimMeasureThreshold (Yes branch of B108), then the augmented text is kept as shown at B110. If, on the other hand, SimMeasure is less than the similarity measure threshold SimMeasureThreshold (No branch of B108), the successively-transformed AugmentedText is discarded, as shown at B112, and is not used for further training and may be discarded.

Because of the randomness that may be present in the 1 . . . n successive transformations performed, in one embodiment, the function TextDataAugmentationFunction may be non-deterministic. For example, consider:

AugmentedText$_0$=TextDataAugmentationFunction(OriginalText)

AugmentedText$_1$=TextDataAugmentationFunction(OriginalText)

Then, because the TextDataAugmentationFunction may be non-deterministic, it is highly likely that AugmentedText$_0$≠AugmentedText$_1$.

Consider the following data:

| | |
|---|---|
| OriginalCorpus | Corpus that contains distinct original text documents |
| OriginalCorpusSize | Number of distinct text documents in OriginalCorpus |
| AugmentedCorpus | Corpus that contains distinct augmented text documents |
| AugmentedCorpusSize | Number of distinct text documents in AugmentedCorpus where AugmentedCorpusSize ≤ OriginalCorpusSize × AugmentationFactor |
| AugmentationFactor | Number of times TextDataAugmentationFunction is called for each original text document |

To produce each augmented text document of AugmentedCorpus, the TextDataAugmentationFunction function is applied AugmentationFactor times on each original text document of OriginalCorpus.

Transformations

According to embodiments, several types of transformations may be used in the TextDataAugmentationFunction. These include, for example:

A transformation relying on multiple steps of machine translation applied to the text;

A plurality of transformations relying on the replacement of words or group of words in the text such as, for example:

Replacement of words or group of words with synonyms;

Replacement or words or group of words with abbreviations (Similarly an abbreviation may be replaced by a word or group of words); and/or Replacement of words with misspellings, Note that, according to embodiments, a transformation of a certain type can be applied a predetermined number (i.e., 0 . . . n) times. The order in which the transformations are applied may be significant. Indeed, replacing words with misspellings may affect the ability of some other transformations to process the text correctly. For example, a transformation that replaces correctly spelled words with words that contain misspellings may affect the ability of a later-applied transformation to find synonyms for the words containing misspellings. Some transformations may not be applied in certain use cases. For example, abbreviations and misspellings should not be used in the context of an augmented text document processed by a voice synthesizer, as some abbreviations and misspellings may not make sense in some instances.

Figure 2:
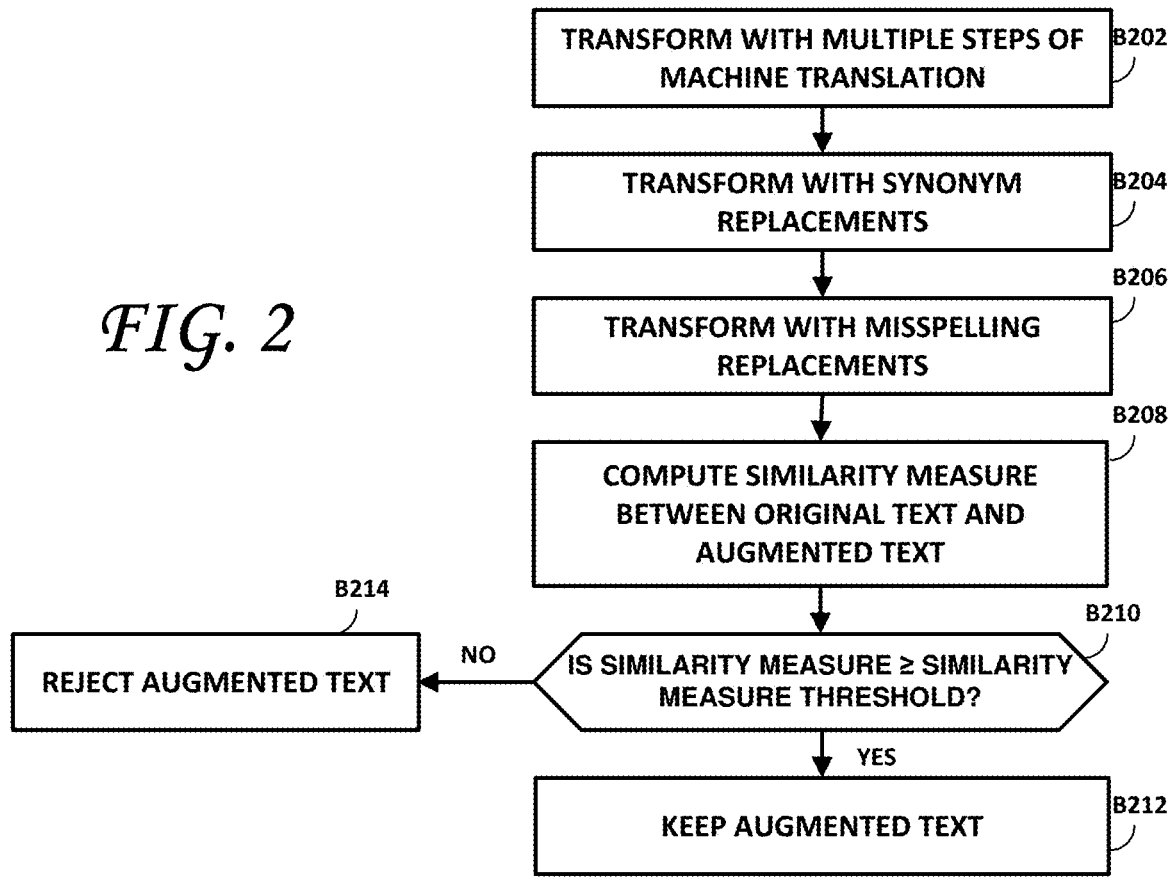
FIG. 2 is a block diagram of a computer-implemented method for data augmentation to improve fraud detection, according to one embodiment.

Consequently, other embodiments of the TextDataAugmentationFunction may be used in the context of the present disclosure. FIG. 2 is a flowchart of a computer-implemented method according to one embodiment. FIG. 2, in particular, is one implementation of the computer-implemented method of claim 1, in which the transformations B102 . . . B104 are implemented as three consecutive transformations; namely, a transformation with multiple steps of machine translation, a transformation with synonym replacements and a transformation with misspelling replacements. One embodiment, therefore, includes a text data augmentation function. For practical purposes in this disclosure, such a function is called TextDataAugmentationFunction. This function takes a text document OriginalText as an input, and outputs a text document AugmentedText. As shown in FIG. 1, according to one embodiment, this function applies 1 . . . n successive transformations to OriginalText to produce AugmentedText, as shown at B102, B104. Thereafter, as shown at B106, a similarity measure, based on OriginalText, may be computed for the resultant successively-transformed AugmentedText. If, as shown at B108, the similarity measure SimMeasure is greater or equal to a similarity measure threshold SimMeasureThreshold (Yes branch of B108), then the augmented electronic text document is kept as shown at B110. If, on the other hand, SimMeasure is less than the similarity measure threshold SimMeasureThreshold (No branch of B108), the successively-transformed AugmentedText may be discarded, as shown at B112, and may not be used for further training.

Returning now to FIG. 2, block B202 calls for multiple step machine translation to be applied to the OriginalText. The resultant transformed OriginalText is then input to another transformation that replaces at least some of the words of the electronic text document presented at its input with synonyms, as shown at B204. The transformed output of B204 may then be input into yet another transformation as shown at B206 to, for example, transform some of the words at its input with words that contain misspellings. It is to be noted that a lesser or a greater number of transformations may be used, and other transformations may be used in addition or instead of the transformation functions shown in FIG. 2. Thereafter, as shown at B208, a similarity measure, based on OriginalText, may be computed for the resultant successively-transformed AugmentedText. If, as shown at B210, the similarity measure SimMeasure is greater or equal to a similarity measure threshold SimMeasureThreshold (Yes branch of B210), then the augmented electronic text document is kept as shown at B212. If, on the other hand, SimMeasure is less than the similarity measure threshold SimMeasureThreshold (No branch of B210), the successively-transformed AugmentedText may be discarded, as shown at B214, and may not be used for further training.

Machine translation has significantly improved in the last years. This improvement is due to the growing use of Neural Machine Translation. Neural Machine Translation typically use deep neural networks, and the performance observed is a direct consequence of the outstanding progress of deep neural networks-related technologies developed in recent years.

Transformation with Multiple Steps of Machine Translation

One embodiment includes a text augmentation method that may utilize multiple steps of machine translation. The following is defined:

| | |
|---|---|
| t | Original text |
| v | Augmented text |
| $L_0, L_1, \ldots, L_m$ | A list of m + 1 distinct languages $L_0$ is the language of t and v |
| $MT_0, MT_1, \ldots, MT_n$ | A list of n + 1 distinct machine translation engines |
| $Translate_{L_i, L_j} MT_k$ | Translate a text from $L_i$ to $L_j$ using $MT_k$ machine translation engine |
| $TranslatePerf_{L_i, L_j} MT_k$ | Performance of translation from $L_i$ to $L_j$ using $MT_k$ machine translation engine |

Such multiple steps, therefore, may transform the original text from its original language to another language and from that language to yet another language or languages and thereafter (eventually) back to the original language of the original electronic text document. A greater or lesser number of intermediate steps may be performed.

Figure 3:
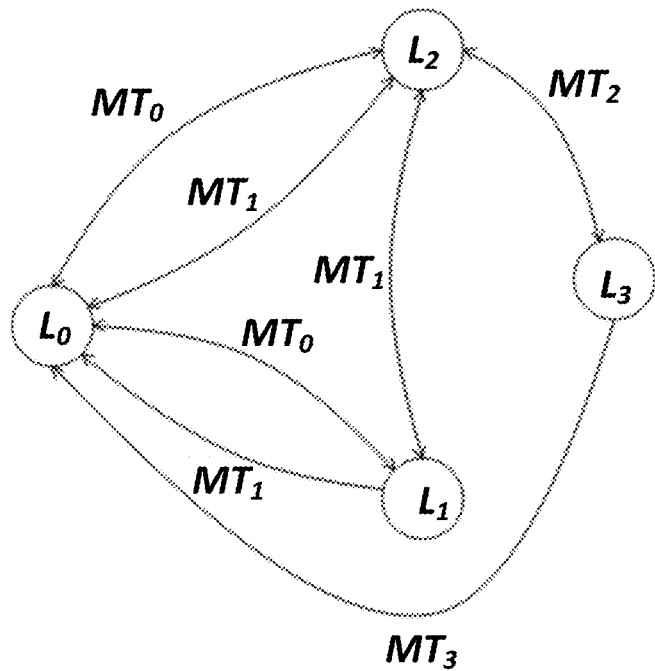
FIG. 3 shows an example of an exemplary directed multigraph according to one embodiment.

FIG. 3 shows an example of directed multigraph according to one embodiment. The following constraints may hold:
  Each vertex is an element of $L=(L_0, L_1, \ldots, L_m)$;
  Each oriented edge between $L_i$ and $L_j$ for a given $MT_k$ is defined by the capacity for a given $MT_k$ machine translation engine to translate from a language $L_i$ to a language $L_j$. This capacity can also be conditioned by a translation performance threshold $TranslatePerfThreshold_{L_i, L_j}$, as the fact that a machine translation engine proposes a translation from a language $L_i$ to a language $L_j$ does not guarantee that the translation will be of sufficient quality; and
  The graph is strongly connected: for every pair of two distinct vertices $L_i$ and $L_j$ in the graph, there is at least one directed path between $L_i$ and $L_j$. The path between the vertices $L_i$ and $L_j$ need not be a direct one and may include an intermediate vertex or several intermediate vertices.

For example, as shown in FIG. 3, the $MT_0$ oriented edge from $L_0$ to $L_2$ indicates that machine translation engine $MT_0$ can translate from $L_0$ to $L_2$. Similarly, the $MT_0$ oriented edge from $L_2$ to $L_0$ indicates that machine translation engine $MT_0$ can translate from $L_2$ to $L_0$. The $MT_3$ oriented edge from $L_3$ to $L_0$ indicates that machine translation engine $MT_3$ can translate from $L_3$ to $L_0$. As no oriented edge from $L_0$ to $L_3$ is present, no machine translation engine is available to translate directly from $L_0$ to $L_3$. As no edges are present in the directed multigraph between $L_3$ and $L_1$, no machine translation engine is available to translate directly from $L_3$ to $L_1$ and from $L_1$ to $L_3$. To translate from $L_3$ to $L_1$ in the directed multigraph of FIG. 3, a path through $L_2$, possibly passing through $L_0$, must be taken. This may be because the translation performance threshold $TranslatePerfThreshold_{L_3, L_1}$ may be below a predetermined threshold, which may be indicative of a poor performance of available machine translation engines between languages $L_3$ and $L_1$. That is, the absence of an oriented edge from $L_3$ to $L_1$ may be associated with a low translation quality indicium. Other relationships may become apparent upon study of this multigraph. Likewise, the exemplary directed multigraph of FIG. 2 disallows direct traversal from $L_0$ to $L_3$. Some other path, such as through the intermediary of vertices $L_1$ and/or $L_2$, must be taken to translate a given text document from the language associated with vertex $L_0$ to the language associated with vertex $L_3$.

A given input electronic text document t may be augmented, according to one embodiment, by traversing the directed multigraph starting at vertex $L_0$ and ending at vertex $L_0$, with the augmented electronic text document v beeing the result of the successive translations of t performed while traversing the graph.

An example of such is detailed hereunder:
  Starting node is $L_0$, which may be termed the original language of the original electronic text document. A vertex adjacent to $L_0$ is randomly selected, such as $L_2$. An edge from $L_0$ to $L_2$ is then randomly selected, such as $MT_1$. Perform the translation with the selected vertex and edge: $u \leftarrow Translate_{L_0 L_2 MT_1}(t)$
  The current node is now $L_2$. A vertex that is adjacent to $L_2$ is randomly selected, such as $L_3$. An edge from $L_2$ to $L_3$ is randomly selected, such as $MT_2$. The translation from $L_2$ to $L_3$ using machine translation engine $MT_2$ is then performed: $u \leftarrow Translate_{L_2 L_3 MT_2}(u)$
  Now, the current node is $L_3$. A vertex adjacent to $L_3$ is randomly selected: $L_0$. An edge from $L_3$ to $L_0$ is then randomly selected, such as $MT_3$. This translation is then performed; namely: $u \leftarrow Translate_{L_3 L_0 MT_3}(u)$
  The current node is again $L_0$ and the output of the last transformation u may now be used as the augmented electronic text document v: $v \leftarrow u$ In this manner, the original electronic text document may be repeatedly translated, using at least one machine translation engine, such that each translated text document is used as a basis for a subsequent translation into another language by traversing the directed multigraph as allowed before re-translating the last-translated electronic text document back into an original language of the original electronic text document.

According to further embodiments, the following strategies may be applied such as, for example:
  Vertices $(L_1, \ldots, L_m)$ may be marked as having been explored and a constraint imposed to avoid exploring the same vertex twice (or another predetermined number of time);
  Use $TranslatePerf_{L_i, L_j, MT_k}$ as a criterium or some other translation quality indicium in the choice of an edge from $L_i$ to $L_j$;
  Utilize a probability distribution P to choose the next vertex. For example, a uniform distribution over the vertex adjacent to $L_i$, noted $\{L_{i0}, \ldots, L_{iq}\}$ may be used, such that P~Unif $\{0,q\}$. Or, if $\text{TranslatePerf}_{L_iL_jMT_k}$ is considered as the weight of the vertex, those q+1 adjacent vertices may be ordered in a list by decreasing weight, and a geometric (or a uniform, Gaussian, Poisson or other) distribution of parameter p may be used: P~Geom(p), which ensures that the probability of choosing a vertex with a low TranslatePerf performance, relatively to the other adjacent vertices, decreases with its position in the ordered list, ensuring that a better performing translation engine will be preferably chosen over a comparatively less performing translation engine.

Other strategies may be devised and selectively applied.

FIG. 4 is a directed multigraph patterned on the directed multigraph of FIG. 3, with $L_0$ being the English language, $L_2$ being the French language and $L_3$ being the Spanish language. Vertex $L_1$, not traversed in this example, may be associated with some other language, such as German, for example. Consider the electronic text document t:

Please process immediately a wire transfer payment of $45,000.
It is an urgent invoice from the business attorney.
Banking instructions attached.
Thanks
William With reference to the electronic text document t, the graph traversal path described in [0033], and the directed multigraph of FIG. 4, the following successive transformations are performed:

$\text{Translate}_{English\ French\ MT_0}$ Veuillez trader immédiatement un virement bancaire de 45 000$.
C'est une facture urgente de l'avocat d'affaires.
Instructions bancaires jointes.
Merci
William $\text{Translate}_{French\ Spanish\ MT_2}$ Por favor, precede una transferencia bancaria de $45,000 inmediatamente.
Es una factura urgente del abogado de negocios.
Se adjuntan instrucciones bancarias.
Gracias
William $\text{Translate}_{Spanish\ English\ MT_3}$ Please proceed with a bank transfer of $45,000 immediately.
It's an urgent bill from the business lawyer.
Banking instructions are attached.
Thanks
William Other successive transformation may be performed, including transformation other than language transformations, as detailed below.

Transformation by Augmenting Text with Replacements

According to one embodiment, text may be augmented by replacing elements of the text by other elements. The following transformations may be defined:

SynonymReplacement: A word or group of words may be replaced by a synonym,

AbbreviationReplacement: A word or group of words may be replaced by an abbreviation (Similarly we can replace an abbreviation by a word or group of words), EntityReplacement: An entity—such as first name or financial amount—may be replaced by another similar entity, MisspellingReplacement: A word may be replaced by a misspelling.

SynonymReplacement Transformation

A synonym is a word or group of words that means exactly or nearly the same as another word or group of words in the same language. This transformation is perhaps the most intuitive one in term of data augmentation techniques available. The following table lists several examples of synonyms.

| Word or group of words | Synonym |
|---|---|
| shut | close |
| industrial democracy | worker participation |

AbbreviationReplacement Transformation

An abbreviation is a short form of a word or a group of words. Note that abbreviations include acronyms. An acronym is a word formed from the first letter of each word of a group of words. The following table lists several examples of abbreviations.

| Word or group of words | Abbreviation |
|---|---|
| account | acct |
| week | wk |
| as soon as possible | ASAP |
| close of business | COB |
| end of day | EOD |

EntityReplacement Transformation

Entities are elements that are present in the electronic text document and which replacement does not affect the meaning of the text. Example of entities include (but are not limited to):

First name of an individual;
Last name of an individual;
A financial amount;
A date; and
A phone number.

Transformations for a first name entity and a financial amount entity, respectively, may be named FirstNameEntityReplacement and FinancialAmountEntityReplacement. A first name entity may be replaced by another first name of the same gender, such as shown in the table below:

| First name entity | Replacement |
|---|---|
| William | John |
| Sarah | Elizabeth |

A financial amount entity may be replaced by another financial amount that is similar in value, may be rounded and/or may be converted to another currency, as shown in the table below:

| Financial amount entity | Replacement |
|---|---|
| $45,000 | $47,200 |
| $45,000 | 38K Euros |

MisspellingReplacement Transformation

Misspellings are quite common in electronic text document:

Misspellings are often accidental,

Misspellings can result from a lack of knowledge in the written language by the writer.

Misspellings can result from the device that is used to type the text. For example, «abd» is a common misspelling of «and» on Azerty and Qwerty keyboards because «B» key is close to «N» key.

Moreover, misspellings are quite common in the context of fraud because a) they can convey a sense of urgency and b) they are traditionally used to evade security technologies that are based on text analysis.

The table below shows a few examples of misspellings.

| Word | Misspelling | Description |
|---|---|---|
| achieve | acheive | Two letters are transposed |
| embarrass | embarass | A letter is missing |
| across | accross | There is an extra letter |
| appearance | appearence | A letter is used instead of another because of their phonetic proximity in the word context |
| and | abd | Typing misspelling |

For example, consider the electronic text document:
Please proceed with a bank transfer of $45,000 immediately.
It's an urgent bill from the business lawyer.
Banking instructions are attached.
Thanks
William Applying a plurality of replacements produces the following augmented electronic text document:
Please proceed with a bank transfer of $47,200 immediatly.
It's an urgent invoice from the business lawyer.
Banking instructions are attached.
Thanks
John To generate the augmented electronic text document immediately above, the following replacements were performed:

| Original element | Replaced element | Transformation |
|---|---|---|
| $45,000 | $47,200 | FinancialAmountEntityReplacement |
| immediately | immediatly | MisspellingReplacement |
| bill | invoice | SynonymReplacement |
| William | John | FirstNameEntityReplacement |

Such an augmented electronic text document retains the general meaning, flavor and syntax of the original electronic text document, while being a good candidate to be added to an existing fraudulent labelled data corpus for training, for example, of a supervised learning model that can detect CEO fraud.

Replacement Transformation

According to one embodiment, the type of an element drives the kind of replacement transformation that may be performed.

| Element type | Transformation |
|---|---|
| Any word or group of words that is not an entity | SynonymReplacement |
| Any word or group of words that is not an entity | AbbreviationReplacement |
| Any entity that is a first name | FirstNameEntityReplacement |
| Any entity that is a financial amount | FinancialAmountEntityReplacement |
| Any word | Misspelling Replacement |

A replacement transformation, according to one embodiment, may include a source σ: this source provides, given an element e, a list of potential replacements $r_e$ and an associated metric μ. According to one embodiment, the metric μ scores the replacement of e by $r_e$:

The score is a continuous value in [0,1] interval

The higher the score, the closer the replacement $r_e$ is to e

In one embodiment, a normalization function, such as Min-Max normalization, may be used to ensure that the metric provides a score with the aforementioned properties.

Below is an example of source and metric for each transformation. Note that if the source does not provide a metric, the metric returns 0, by definition.

| Transformation | Source | Metric |
|---|---|---|
| Synonym Replacement | Thesaurus | Semantic closeness |
| Abbreviation Replacement | List of common abbreviations | Frequency of use |
| FirstNameEntity Replacement | List of first names of a given gender | Popularity of first names of a given gender |
| FinancialAmount EntityReplacement | A mathematic formula, for instance if we consider a replacement $r_a$ of amount a: $$r_a = \text{ceiling}\left(a + \text{random}\left(-\frac{a}{d}, \frac{a}{d}\right), n\right)$$ | Proximity of financial amounts, for instance: $$1 - \frac{|r_a - a|}{a}$$ |

-continued

| Transformation | Source | Metric |
|---|---|---|
| | where random (x,y) returns a random number in [x,y] interval and d > 1, ceiling (z,n) returns the value of z rounded to the next multiple of n and n is a natural number. For instance: ceiling (711.17, 10) = 720 | |
| Misspelling Replacement | List of common misspellings | Frequency of misspellings |

The following data are defined:

| | |
|---|---|
| t | Original electronic text document |
| v | Augmented electronic text document |
| e | Original element |
| ê | Replaced element |
| $T_e$ | Type of e. The type of element can be, but is not limited to {FirstNameEntity, FinancialAmountEntity, NotAnEntity, AnyOtherWord}. All the types are mutually exclusive i.e. an element can only have exactly one type. |
| σ | A source of knowledge. |
| $r_e$ | A potential replacement for element e. |
| μ | Metric function to score replacement $r_e$ of element e. |
| $\gamma_{r_e, \mu}$ | A value associated to a replacement r based on the metric function μ. |
| getType | Return the type $T_e$ of e.<br>Formally, we have:<br>$T_e$ = getType(e) |
| generateReplacements | Generate a list of potential replacements $r_e$ for e. generateReplacements relies on a source σ that is associated to the type $T_e$ of element e obtained using getType.<br>Formally, we have:<br>$r_e$ ← generateReplacements(e, σ) |
| evaluateReplacement | Return the value $\gamma_{r_e, \mu}$ associated to the replacement $r_e$ of element e given by the metric function μ.<br>Formally, we have:<br>$\gamma_{r_e, \mu}$ = evaluateReplacement(e, $r_{e, \mu}$) |
| selectElements | Identify a list of elements {$e_0$, ... , $e_k$} of the same type T from text t that could be transformed and randomly selects l of them to be transformed given the probability distribution P. For example, we could use the uniform distribution over k + 1: P ~ Unif {0, k}<br>Formally, we have:<br>{$e_i$, ... , $e_j$} ← selectElements(t, P) of size l |
| selectReplacement | The algorithm is as follows:<br>1. given an element e, generate from the source σ a list of potential replacements [$r_{e,0}$, ... , $r_{e,n}$] using n + 1 times the generateReplacements algorithm on e;<br>2. calculate the value of each replacement $r_{e,i}$ of e using the metric function μ and the algorithm evaluateReplacement.<br>3. sort the list by decreasing value;<br>4. randomly select an index k ∈ {0, n} given the probability distribution $P_1$. For example, we could use the geometric (for example) distribution of parameter p: $P_1$ ~ Geom(p), which ensures that highly valued replacements in the sorted list are more likely to be selected;<br>5. return the chosen element ê at index k of the list.<br>Formally, we have:<br>ê ← selectReplacement(e, μ, $P_1$) |
| replace Elements | replaceElements takes the original text t, the list of elements to be replaced {$e_i$, ... , $e_j$} and their replacements {$ê_i$, ... , $ê_j$} and returns the augmented electronic text document v.<br>Formally, we have:<br>v ← replaceElements(t, L, L̂)<br>With L ← selectElements(t, P) of length l + 1<br>and ∀i ∈ {0, l}, $L̂_i$ ← selectReplacement($L_i$, μ, $P_1$) |

Figure 6:
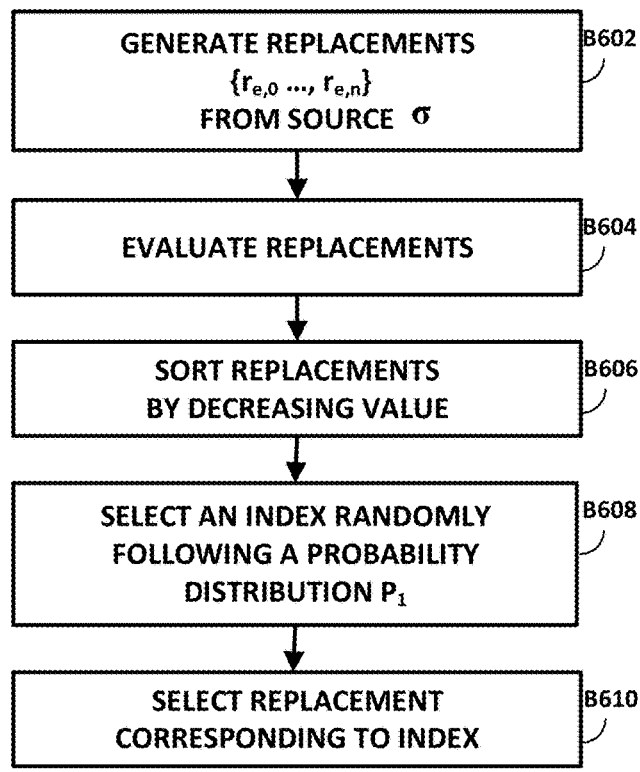
FIG. 6 is a block diagram of a computer-implemented method for generating and selecting replacement elements within a text document of a corpus of electronic text documents, according to one embodiment.

FIGS. 5 and 6 are flowcharts of a computer-implemented method of selecting and replacing elements for data augmentation, according to one embodiment. As shown therein, block B502 calls for selecting the elements $\{e_i, \ldots, e_j\}$ from an electronic text document to be replaced. As shown in the table above, one embodiment calls for identifying a list of elements $\{e_0, \ldots, e_k\}$ of the same type T from electronic text document t that could be transformed and randomly selecting l of them to be transformed given the probability distribution P. For example, the uniform distribution over k+1 can be used for this purpose: P~Unif{0, k}. Formally, this may be represented as $\{e_i, \ldots, e_j\} \leftarrow$ selectElements(t, P) of size l, as shown at block B502 in FIG. 5. Thereafter, blocks B504 through B506 (a variable number of functional blocks, depending upon the number of selected elements $\{e_i, \ldots, e_j\}$), replacements are selected for elements $e_i$ to $e_j$ by evaluating a function selectReplacement. According to one embodiment, the selectReplacement function detailed in the table above may be used to consecutively select the replacements for the selected elements. One embodiment of the selectReplacement function is shown in FIG. 6 and may be configured such that, given an element e, a list of potential replacements $\{r_{e,0}, \ldots, r_{e,n}\}$ is generated from the source a, using the generateReplacements algorithm on e, as shown at B602.

As shown at B604, the value of each replacement $r_{e,i}$ of e may then be computed. According to one embodiment, the value of each replacement $r_{e,i}$ of e may be computed using a metric function μ and an evaluateReplacement function. Such an evaluateReplacement function, as shown in the table above, may be configured to return a value $\gamma r_{e,\mu}$ associated with the replacement $r_e$ of element e given by the metric function represented formally as $\gamma r_{e,\mu}$=evaluateReplacement (e, $r_e$, μ). In one embodiment, the list of potential replacements $\{r_{e,0}, \ldots, r_{e,n}\}$ may then be sorted by, for example, decreasing value of their respective $\gamma r_{e,\mu}$ values, as shown at B606. Thereafter, an index k∈{0, n} into the list of potential replacements $\{r_{e,0}, \ldots, r_{e,n}\}$ may be randomly selected given the probability distribution $P_1$, as called for by block B608. For example, the geometric (or a uniform, Gaussian, Poisson or other) distribution of parameter p: $P_1$~Geom(p) may be used, which ensures that highly valued potential replacements in the sorted list are more likely to be selected than comparatively lower-valued potential replacements. Then, the chosen element ê at index k of the list may be returned as the selected replacement as shown at B610. As shown in the table above, such may be formally represented as ê←selectReplacement(e,μ, $P_1$). Returning now to FIG. 5, the selected elements may then be replaced with the selected replacements, as called for by block 508. According to one embodiment, a replaceElements function may be defined that takes the original electronic text document t, the list of elements to be replaced $\{e_i, \ldots, e_j\}$ and their replacements $\{ê_i, \ldots, ê_j\}$ and returns the augmented electronic text document v, formally represented as v←replaceElements(t, L, L̂), with L←selectElements(t, P) of length l+1 and ∀i∈{0, 1}, $L̂_i$←selectReplacement($L_i$, μ, $P_1$).

Validation of Augmented Electronic Text Document

One embodiment validates each generated augmented electronic text document AugmentedCorpus produced to ensure that it improves the generalization of the model. If, for example, an augmented electronic text document is determined to be too noisy, it is discarded, as it is unlikely to improve the generalization of the model for which the augmented data is being produced. In the case of machine learning, the validation ensures that the label of the augmented electronic text document preserves the label of the original electronic text document. For this purpose, a validation module should be able to analyze the validity of an augmented electronic text document given the original electronic text document. Such a validation method may encompass any metric and method configured to output a metric of comparison. Consider the Compare function described in the table below:

| | |
|---|---|
| t | Original text |
| v | Augmented text |
| $\{A_0, \ldots, A_m\}$ | A list of m distinct similarity algorithms A |
| $s_A$ | The similarity measure given between two texts for algorithm A |
| Compare | An algorithm that compares two electronic text documents $t_1$ and $t_2$ and outputs a similarity measure. The algorithm can combine several similarity measures $\{s_0, \ldots, s_n\}$ to output a final similarity measure S. S has the following properties<br>$0 \le S \le 1$<br>$S(t_1, t_1) = 1$<br>$S(t_1, t_2)$ value increases with the similarity of $t_1$ and $t_2$<br>Formally, for two electronic text documents $t_1$ and $t_2$ we have:<br>$S = $ Compare $(t_1, t_2)$ |
| T | A threshold associated to the Compare method chosen |

The augmented electronic text document will be kept if and only if S≥T with S=Compare(t, v). That is, according to one embodiment, the augmented text will be kept if and only if the value of the similarity measure S (between 0 and 1 with 0 indicating completely dissimilar electronic text documents and 1 indicating complete similarity of electronic text documents) is greater or equal to the similarity threshold associated with the Compare method chosen, with the similarity measure being the result of applying the selected Compare method to the original electronic text document t and the augmented electronic text document v.

The Compare algorithm make use of the computation of one or more similarity measures $s_A$ given by one or more similarity algorithms A. Two embodiments of such similarity algorithms are presented here, with the understanding that the present embodiments are not limited to those two families of algorithms, as there exists numerous ways of comparing the similarity of two texts, and all are encompassed by the present disclosure.

Semantic Similarity

Semantic similarity captures the notion of closeness of meaning between two sentences. It is often the first idea of similarity that comes to mind. As such, it will often be preferred to syntactic similarity. However, it is more difficult to capture this semantic notion, thus the results given by semantic similarity may be less precise than those given by syntactic similarity.

Embodiments are not limited by any one method of determining semantic similarity. Such methods may rely on the notion of ontology, which is the knowledge source, i.e., a set of concepts that are connected to each other. Most of the time, the ontology will be ordered hierarchically to form a taxonomy. Given this ontology, a metric of similarity may be extracted, for example, by taking into account the path length between the two concepts compared. One embodiment uses a semantic similarity measure, alone or together with a syntactical similarity measure.

Syntactic Similarity

One embodiment uses a syntactic similarity measure, alone or together with a semantic similarity measure. A syntactic similarity metric measures the syntactical similarity between two electronic text documents. It is, for example, possible to calculate, given the Part-Of-Speech tag of each word in two sentences, the cosine similarity measure of those two sentences. The result is independent from the semantic meaning of the sentences, but is closely related to how those sentences are constructed.

Use Cases of Embodiments

In the context of fraud detection, the data augmentation embodiments may be applied to increase the size of the fraudulent labelled data corpus. The data augmentation embodiments presented herein are label preserving transformations. Reciprocally, these embodiments may also be applied to augment the size of the non-fraudulent labelled data corpus. Several use cases of such data augmentation techniques are presented herein. Note that herein, the term "corpus" may refer to the fraudulent labelled data corpus, the non-fraudulent labelled data corpus or both.

Merge Original Corpus and Augmented Corpus to Build Fraud Detection Model

Figure 7:
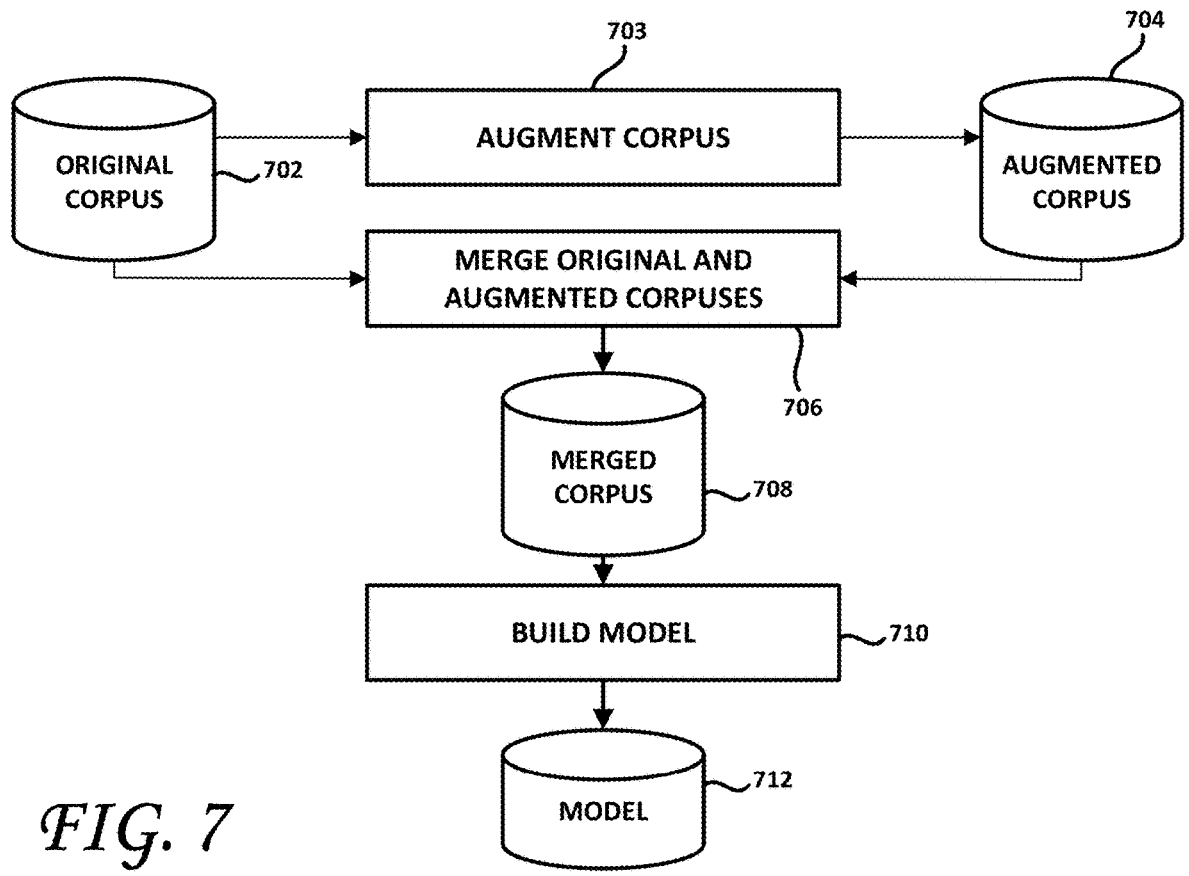
FIG. 7 is a block diagram of a computer system for building a fraud detection model based on a merged corpus comprising an original corpus and an augmented corpus, according to one embodiment.

In this exemplary embodiment, the original corpus and the augmented corpus are merged together to build a fraud detection model. With reference to FIG. 7, to do so, the original corpus 702 is augmented at 703 to produce an augmented corpus 704, as described and shown herein. The original corpus 702 and the augmented corpus 704 are then merged, at 706 to produce a merged corpus 708, which is used to generate, at 710, a model 712.

Testing a Fraud Detection Model

Figure 8:
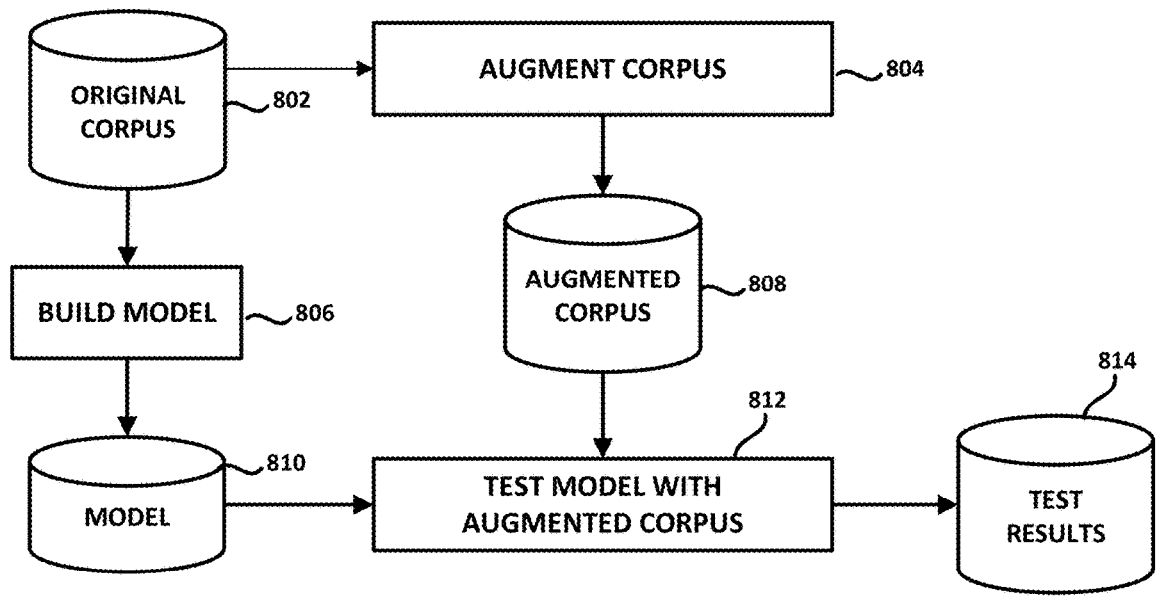
FIG. 8 is a block diagram of a computer system for using an augmented corpus to test a fraud detection model, according to one embodiment.

As shown in the block diagram of FIG. 8, the original corpus 802 may be used at 806 to build a model 810. The original corpus is used in this case to build the model 810, without relying on the augmented corpus, for validation purposes. The original corpus 802 may be augmented at 804 to generate an augmented corpus 808, which is also used to test, at 812, the model 810. This produces the test results at 814.

Use Augmented Data to Train and/or Test Users at Risk Within an Organization

In this use case, the augmented data set may be used to train and/or test users at risk within an organization. Training employees with simulated attacks to increase awareness is a growing practice, in particular in the context of phishing attacks. Users within an organization may be considered at risk for advanced fraud such as CEO fraud, if they meet one or more of the following criteria:

They have direct or indirect access to confidential information,

They have direct or indirect access to the organization banking accounts,

Their professional details (position within the organization, email address, phone number, instant messaging identifier . . . ) are exposed on the Internet.

Figure 9:
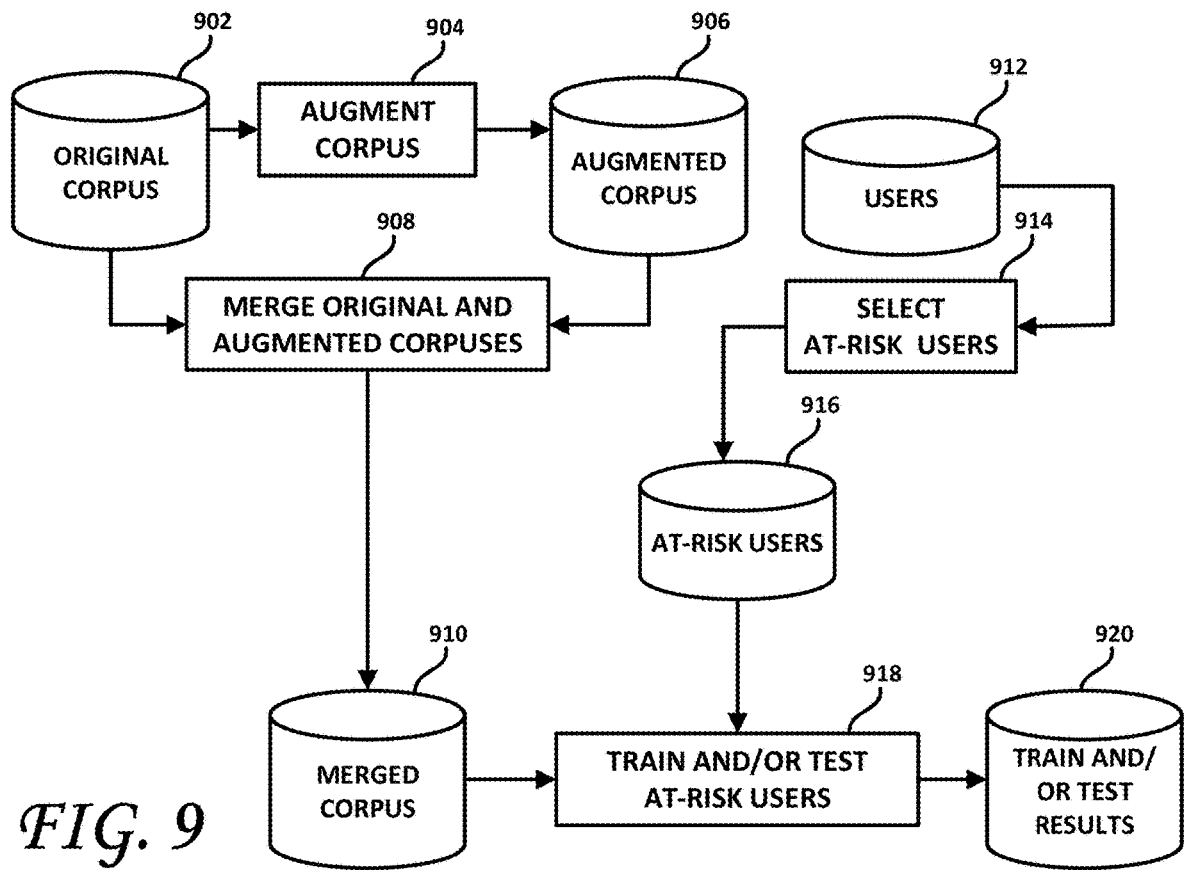
FIG. 9 is a block diagram of a computer system for using augmented data to train and/or to test users considered to be "at risk" within an organization.

The training and/or testing of users considered to be at risk may be performed by email, but also by other electronic communication means such as instant messaging, text message or even voice messages. As shown in FIG. 9, to train at-risk users within an organization, according to one embodiment, the original corpus 902 is augmented, at 904, to produce an augmented corpus 906. The original corpus 902 and the augmented corpus 906 are merged at 908 to produce a merged corpus 910, as shown in FIG. 9. Users 912 within the organization are evaluated and from those, at-risk users 916 are selected at 914 using, for example, the above-listed criteria. The merged corpus 910 may then be used to train and/or test, as shown at 918, the at-risk users 916, using one or several electronic communication modalities. This training and/or testing at 918 generates results 920, which are collected. Further action may then be taken to improve awareness of these at-risk users depending on results 920.

Accordingly, in one embodiment a computer-implemented method for augmenting an original electronic text document of a corpus of text documents may comprise receiving the original electronic text document in a computer having a memory; repeatedly translating the received original electronic text document, using at least one machine translation engine, such that each translated electronic text document is used as a basis for a subsequent translation into another language before re-translating a last-translated electronic text document back into an original language of the original electronic text document; transforming the re-translated electronic text document by selecting at least one word therein and substituting a respective synonym for each selected word to generate a synonym-replaced electronic text document; transforming the synonym-replaced electronic text document by selecting at least one word therein and substituting a respective misspelled word for each selected word to generate an augmented electronic text document; computing a similarity measure between the original electronic text document and the augmented electronic text document; determining whether the computed similarity measure is at least as great as a predetermined similarity threshold; and keeping and storing the augmented electronic text document in the memory if the computed similarity measure is at least as great as the predetermined similarity threshold and not storing the augmented electronic text document in the memory if the computed similarity measure is determined to be less than the predetermined similarity threshold.

According to further embodiments, repeatedly translating, transforming the re-translated electronic text document and transforming the synonym-replaced electronic text document may be performed out sequentially, in order. Each of the translating and transforming steps may be configured to be sequentially performed a predetermined number of times. The computer-implemented method may further comprise selecting one or more words in the re-translated or synonym-replaced electronic text document and replacing each of the selected word(s) with a respective abbreviation. The repeatedly translating, transforming the re-translated electronic text and/or transforming the synonym-replaced electronic text document may be non-deterministic in nature. Computing the similarity measure may comprise computing at least a semantic and/or syntactical similarity measure between the original electronic text document and the augmented electronic text document. The method may further comprise selecting one or more entities in the re-translated or synonym-replaced electronic text document and replacing the selected entity(ies) with a replacement entity or entities. The selected entity(ies) may comprise a first name of an individual, last name of an individual, a financial amount, a date and/or a telephone number. Other entities may be selected and replaced, according to the nature of the electronic text document, the subject matter, the industry, etc.

Another embodiment is also a computer-implemented method that may comprise establishing a directed multigraph where each vertex of a plurality of vertices is associated with a separate language, each vertex being connected to at least one other one of the plurality of vertices by an oriented edge that is indicative of a machine translation engine's ability to translate between languages associated with the vertices connected by the oriented edge with acceptable performance; storing the established directed multigraph in a memory of a computer; traversing the stored directed multigraph starting at a predetermined origin vertex associated with an original language of the original electronic text document by randomly selecting an intermediate vertex of the plurality of vertices pointed to by an oriented edge connected to the predetermined origin vertex and causing a machine translation engine to translate the original electronic text document from the original language to a language associated with the selected vertex; and continuing to traverse the directed multigraph stored in the memory of the computer as allowed (i.e., in the direction of the arrows) by the oriented edges from the intermediate vertex to successive other next-adjacent connected vertices of the plurality of vertices, each time machine translating a previously-translated electronic text document into a language associated with a randomly-selected next-adjacent vertex of the plurality of vertices until the predetermined origin vertex is selected and the previously translated electronic text document is re-translated into the original language; and storing the re-translated electronic text document in the memory of the computer as an augmented electronic text document.

The present computer-implemented method may also further comprise marking traversed vertices; and preventing the marked vertices from being traversed more than a predetermined number of times. The method may further comprise associating each directed edge between adjacent vertices with a quality indicium, and selection of a next-adjacent vertex to be traversed when at least two adjacent vertices are available for traversal may be at least partially dependent upon the quality indicium. The random selection of a next-adjacent vertex may be performed such that the probability of selecting a next-adjacent vertex connected via a directed edge associated with a lower quality indicium is lower than a probability of selecting a next-adjacent vertex connected via a directed edge associated with a comparatively higher quality indicium. The method, according to one embodiment, may further comprise fitting each of the directed edges of next adjacent vertices in a predetermined distribution of the associated quality indicium. Randomly selecting the next-adjacent vertex further may comprise preferentially selecting, in the predetermined distribution, a next adjacent vertex connected to by a directed edge associated with a higher quality indicium rather than a lower quality indicium.

According to still another embodiment, a computer-implemented method may comprise providing and storing an electronic text document in a memory of a computer and generating an augmented electronic document from the provided electronic document by iteratively:

selecting an element in the provided electronic text document;

generating a list of potential replacement elements from a source of potential replacement elements of a type of the selected element;

calculating a value of each potential replacement element in the list of potential replacement elements using a predetermined metric;

ranking the values of the potential replacement elements in the list of potential replacement elements in decreasing order of the calculated value;

randomly selecting an index into the ranked list of potential replacement elements given a probability distribution, such an index associated with a higher-ranked potential replacement element could be more likely to be selected than an index associated with a comparatively lower-ranked potential replacement element, depending on the probability distribution chosen; and replacing the selected element in the provided electronic text document with the potential replacement element at the randomly-selected index.

The probability distribution may be, for example, a geometric, Gaussian, Poisson or other probability distribution.

Another embodiment is a computing device comprising at least one processor; at least one data storage device coupled to the at least one processor; a network interface coupled to the at least one processor and to a computer network; and a plurality of processes spawned by the at least one processor to augment an original electronic text document of a corpus of electronic text documents. The processes may include processing logic for repeatedly translating the original electronic text document, using at least one machine translation engine, such that each translated text document is used as a basis for a subsequent translation into another language before re-translating a last-translated electronic text document back into an original language of the original electronic text document; transforming the re-translated electronic text document by selecting at least one word therein and substituting a respective synonym for each selected word to generate a synonym-replaced electronic text document; transforming the synonym-replaced electronic text document by selecting at least one word therein and substituting a respective misspelled word for each selected word to generate an augmented electronic text document; computing a similarity measure between the original electronic text document and the augmented electronic text document; determining whether the computed similarity measure is at least as great as a predetermined similarity threshold; and keeping and storing the augmented text in the data storage device if the computed similarity measure is at least as great as the predetermined similarity threshold and discarding and not storing the augmented electronic text document in the data storage device if the computed similarity measure is less than the predetermined similarity threshold.

According to one embodiment, the processing logic for repeatedly translating, transforming the re-translated text and transforming the synonym-replaced electronic text document may be performed sequentially, in order. The processing logic for each of the translating and transforming steps may be configured to be sequentially executed a predetermined number of times. Processing logic may be provided for selecting one or more words in the re-translated or synonym-replaced electronic text document and replacing the selected word(s) with a respective abbreviation or abbreviations. The processing logic for at least repeatedly translating, transforming the re-translated text and transforming the synonym-replaced electronic text document may be non-deterministic—i.e., may not result in the same output despite being fed a same input. The processing logic for computing the similarity measure may comprise processing logic for computing a semantic and/or a syntactical (and/or other) similarity measure between the original electronic text document and the augmented electronic text document. Processing logic may further be provided for selecting one or more entities in the re-translated or synonym-replaced electronic text document and for replacing the selected entity(ies) with a replacement entity or entities. The selected entity(ies) may comprise a first name of an individual, last name of an individual, a financial amount, a date and/or a telephone number, to identify but a few of the myriad possibilities.

Another embodiment is a computing device comprising at least one processor; at least one data storage device coupled to the at least one processor; a network interface coupled to the at least one processor and to a computer network; a plurality of processes spawned by the at least one processor to augment an original electronic text document of a corpus of electronic text documents. The processes may include processing logic for establishing and storing, in the data storage device, a directed multigraph where each vertex of a plurality of vertices may be associated with a separate language, each vertex being connected to at least one other one of the plurality of vertices by an oriented edge that is indicative of a machine translation engine's ability to translate between languages associated with the vertices connected by the oriented edge with acceptable performance; traversing the directed multigraph starting at a predetermined origin vertex associated with an original language of the original electronic text document by randomly selecting an intermediate vertex of the plurality of vertices pointed to by an oriented edge connected to the predetermined origin vertex and causing a machine translation engine to translate the original electronic text document from the original language to a language associated with the selected vertex; continuing to traverse the directed multigraph as allowed by the oriented edges from the intermediate vertex to successive other next-adjacent connected vertices of the plurality of vertices, each time translating a previously-translated electronic text document into a language associated with a randomly-selected next-adjacent vertex of the plurality of vertices until the predetermined origin vertex is selected and the previously translated electronic text document is re-translated into the original language, the re-translated electronic text document being designated as an augmented electronic text document; and storing the augmented electronic document in the data storage device.

Processing logic may be provided for using the augmented electronic text document to train and/or test a model to detect fraudulent communications. The processing logic may be further configured for marking traversed vertices; and preventing marked vertices from being traversed more than a predetermined number of times. Processing logic may be provided for associating each directed edge between adjacent vertices with a quality indicium and selection of a next-adjacent vertex to be traversed when at least two adjacent vertices are available for traversal is at least partially dependent upon the quality indicium. The random selection of a next-adjacent vertex may be performed such that a probability of selecting a next-adjacent vertex connected via a directed edge associated with a lower quality indicium is lower than the probability of selecting a next-adjacent vertex connected via a directed edge associated with a comparatively higher quality indicium. One embodiment may further comprise processing logic for fitting each of the directed edges of next adjacent vertices in a predetermined distribution of the associated quality indicium and randomly selecting the next-adjacent vertex further may comprise preferentially selecting, in the predetermined distribution, a next adjacent vertex connected to by a directed edge associated with a higher quality indicium rather than a lower quality indicium.

Figure 10:
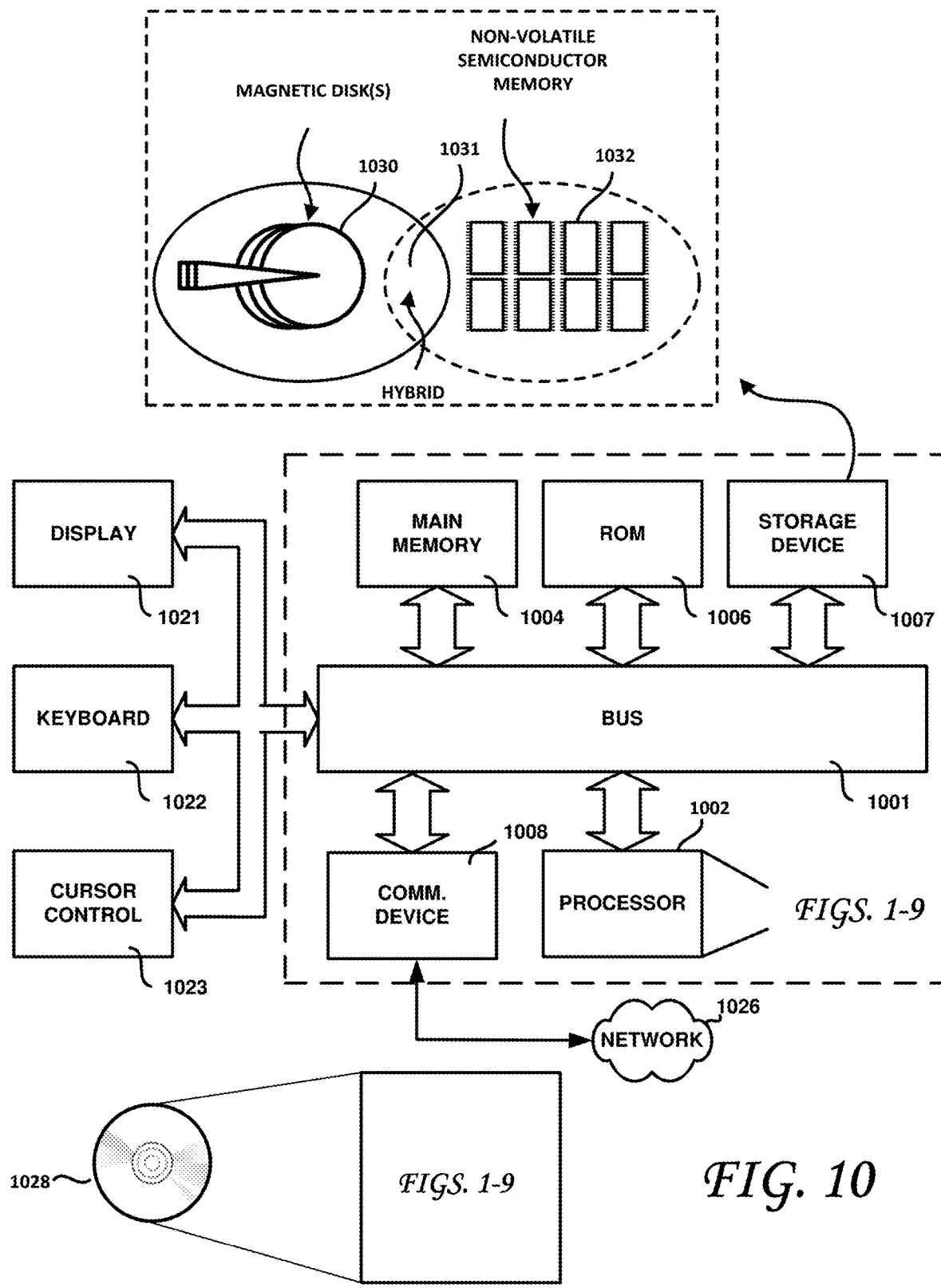
FIG. 10 is a block diagram of a computing device with which embodiments may be practiced.

FIG. 10 illustrates a block diagram of a computing device such as client computing device, email (electronic message) server, with which embodiments may be implemented. The computing device of FIG. 10 may include a bus 1001 or other communication mechanism for communicating information, and one or more processors 1002 coupled with bus 1001 for processing information. The computing device may further comprise a random-access memory (RAM) or other dynamic storage device 1004 (referred to as main memory), coupled to bus 1001 for storing information and instructions to be executed by processor(s) 1002. Main memory (tangible and non-transitory, which terms, herein, exclude signals per se and waveforms) 1004 also may be used for storing temporary variables or other intermediate information during execution of instructions by processor 1002. The computing device of FIG. 10 may also include a read only memory (ROM) and/or other static storage device 1006 coupled to bus 1001 for storing static information and instructions for processor(s) 1002. A data storage device 1007, such as a magnetic disk and/or solid-state data storage device may be coupled to bus 1001 for storing information and instructions—such as would be required to carry out the functionality shown and disclosed relative to FIGS. 1-9. The computing device may also be coupled via the bus 1001 to a display device 1021 for displaying information to a computer user. An alphanumeric input device 1022, including alphanumeric and other keys, may be coupled to bus 1001 for communicating information and command selections to processor(s) 1002. Another type of user input device is cursor control 1023, such as a mouse, a trackball, or cursor direction keys for communicating direction information and command selections to processor(s) 1002 and for controlling cursor movement on display 1021. The computing device of FIG. 10 may be coupled, via a communication interface (e.g., modem, network interface card or NIC) 1008 to the network 1026.

As shown, the storage device 1007 may include direct access data storage devices such as magnetic disks 1030, non-volatile semiconductor memories (EEPROM, Flash, etc.) 1032, a hybrid data storage device comprising both magnetic disks and non-volatile semiconductor memories, as suggested at 1031. References 1004, 1006 and 1007 are examples of tangible, non-transitory computer-readable media having data stored thereon representing sequences of instructions which, when executed by one or more computing devices, implement the data augmentation methods described and shown herein. Some of these instructions may be stored locally in a client computing device, while others of these instructions may be stored (and/or executed) remotely and communicated to the client computing over the network 1026. In other embodiments, all of these instructions may be stored locally in the client or other standalone computing device, while in still other embodiments, all of these instructions are stored and executed remotely (e.g., in one or more remote servers) and the results communicated to the client computing device. In yet another embodiment, the instructions (processing logic) may be stored on another form of a tangible, non-transitory computer readable medium, such as shown at 1028. For example, reference 1028 may be implemented as an optical (or some other storage technology) disk, which may constitute a suitable data carrier to load the instructions stored thereon onto one or more computing devices, thereby re-configuring the computing device(s) to one or more of the embodiments described and shown herein. In other implementations, reference 1028 may be embodied as an encrypted solid-state drive. Other implementations are possible.

Embodiments of the present invention are related to the use of computing devices to implement novel data augmentation techniques to enrich a corpus of text documents to, for example, improve fraud detection in maliciously-motivated communications. According to one embodiment, the methods, devices and systems described herein may be provided by one or more computing devices in response to processor(s) 1002 executing sequences of instructions, embodying aspects of the computer-implemented methods shown and described herein, contained in memory 1004. Such instructions may be read into memory 1004 from another computer-readable medium, such as data storage device 1007 or another (optical, magnetic, etc.) data carrier, such as shown at 1028. Execution of the sequences of instructions contained in memory 1004 causes processor(s) 1002 to perform the steps and have the functionality described herein. In alternative embodiments, hard-wired circuitry may be used in place of or in combination with software instructions to implement the described embodiments. Thus, embodiments are not limited to any specific combination of hardware circuitry and software. Indeed, it should be understood by those skilled in the art that any suitable computer system may implement the functionality described herein. The computing devices may include one or a plurality of microprocessors working to perform the desired functions. In one embodiment, the instructions executed by the microprocessor or microprocessors are operable to cause the microprocessor(s) to perform the steps described herein. The instructions may be stored in any computer-readable medium. In one embodiment, they may be stored on a non-volatile semiconductor memory external to the microprocessor, or integrated with the microprocessor. In another embodiment, the instructions may be stored on a disk and read into a volatile semiconductor memory before execution by the microprocessor.

Portions of the detailed description above describe processes and symbolic representations of operations by computing devices that may include computer components, including a local processing unit, memory storage devices for the local processing unit, display devices, and input devices. Furthermore, such processes and operations may utilize computer components in a heterogeneous distributed computing environment including, for example, remote file servers, computer servers, and memory storage devices. These distributed computing components may be accessible to the local processing unit by a communication network.

The processes and operations performed by the computer include the manipulation of data bits by a local processing unit and/or remote server and the maintenance of these bits within data structures resident in one or more of the local or remote memory storage devices. These data structures impose a physical organization upon the collection of data bits stored within a memory storage device and represent electromagnetic spectrum elements.

A process, such as the computer-implemented data augmentation methods described and shown herein, may generally be defined as being a sequence of computer-executed steps leading to a desired result. These steps generally require physical manipulations of physical quantities. Usually, though not necessarily, these quantities may take the form of electrical, magnetic, or optical signals capable of being stored, transferred, combined, compared, or otherwise manipulated. It is conventional for those skilled in the art to refer to these signals as bits or bytes (when they have binary logic levels), pixel values, works, values, elements, symbols, characters, terms, numbers, points, records, objects, images, files, directories, subdirectories, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, illuminating, removing, altering and the like. The operations described herein are machine operations performed in conjunction with various input provided by a human or artificial intelligence agent operator or user that interacts with the computer. The machines used for performing the operations described herein include local or remote general-purpose digital computers or other similar computing devices.

In addition, it should be understood that the programs, processes, methods, etc. described herein are not related or limited to any particular computer or apparatus nor are they related or limited to any particular communication network architecture. Rather, various types of general-purpose hardware machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

While certain example embodiments have been described, these embodiments have been presented by way of example only, and are not intended to limit the scope of the embodiments disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

The invention claimed is:

1. A computer-implemented method, comprising:
   providing and storing an electronic text document in a memory of a computer and generating an augmented electronic text document from the provided electronic text document by successively transforming the electronic text document by iteratively:
   selecting an element in the provided electronic text document;
   generating a list comprising a plurality of potential replacement elements from a source of potential replacement elements of a type of the selected element;
   calculating a value of each of the plurality of potential replacement elements in the generated list using a predetermined metric;
   ranking the values of the plurality of potential replacement elements in the generated list in decreasing order of the calculated value;
   randomly selecting an index into the ranked list according to a predetermined probability distribution, an index associated with a higher-ranked potential replacement element of the plurality of potential replacements being more likely to be selected than an index associated with a comparatively lower-ranked potential replacement element of the plurality of potential replacements; and replacing the selected element in the provided electronic text document with the potential replacement element at the randomly-selected index.

2. The computer-implemented method of claim 1, wherein the probability distribution is a one of a geometric, uniform, Gaussian and Poisson probability distribution.

* * * * *